US011562198B2

(12) United States Patent
Yatziv et al.

(10) Patent No.: US 11,562,198 B2
(45) Date of Patent: *Jan. 24, 2023

(54) VIRTUAL ASSISTANT GENERATION OF GROUP RECOMMENDATIONS

(71) Applicant: Google LLC, Mountain View, CA (US)

(72) Inventors: Liron Yatziv, Sunnyvale, CA (US); Shlomo Krepner, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 469 days.

This patent is subject to a terminal disclaimer.

(21) Appl. No.: 16/884,462

(22) Filed: May 27, 2020

(65) Prior Publication Data

US 2020/0285931 A1 Sep. 10, 2020

Related U.S. Application Data

(63) Continuation of application No. 15/394,979, filed on Dec. 30, 2016, now Pat. No. 10,699,181.

(51) Int. Cl.
G06N 3/00 (2006.01)
G06Q 30/02 (2012.01)
(Continued)

(52) U.S. Cl.
CPC ............ *G06N 3/006* (2013.01); *G06F 16/00* (2019.01); *G06F 21/60* (2013.01); *G06N 5/04* (2013.01);
(Continued)

(58) Field of Classification Search
CPC .......... G06N 5/04; G06Q 50/01; G06Q 50/00; G06F 21/60; G06F 16/00; H04L 51/32
See application file for complete search history.

(56) References Cited

U.S. PATENT DOCUMENTS 10,699,181 B2   6/2020   Yatziv et al.
2004/0006591 A1  1/2004  Matsui et al.
(Continued)

FOREIGN PATENT DOCUMENTS

CN   101874255   10/2010
CN   103493463   1/2014
(Continued)

OTHER PUBLICATIONS

Kim et al. "A group recpmmendation system for online communities", IJIM, 2010, pp. 212-219.*
China National Intellectual Property Admininstration; Notice of Allowance issued in Application No. 201710906362.0; 6 pages; dated Jan. 18, 2021.
Taiwan Intellectual Property Office; Notice of Allowance issued in Application No. 106133497; 3 pages; dated Oct. 29, 2020.
(Continued)

Primary Examiner — Li Wu Chang
(74) Attorney, Agent, or Firm — Gray Ice Higdon

(57) ABSTRACT

In one example, a method includes generating, responsive to receiving a request for a recommendation for a group of users and based on first privacy level data for users of the group, an original list of recommendations for the group. In this example, the method further includes evaluating, by respective computational assistants associated with the users of the group and based on respective second privacy level data for the users of the group, recommendations from the original list of recommendations for inclusion in a pruned list of recommendations for the group, wherein the second privacy level is more restricted than the first privacy level. In this example, the method further includes, in response to the pruned list of recommendations including at least one recommendation, outputting, for presentation to the users of the group, the pruned list of recommendations.

17 Claims, 5 Drawing Sheets

(51) Int. Cl.
*G06Q 10/10* (2012.01)
*G06F 21/60* (2013.01)
*G06F 16/00* (2019.01)
*G06N 5/04* (2006.01)

(52) U.S. Cl.
CPC ....... *G06Q 10/103* (2013.01); *G06Q 30/0269* (2013.01)

(56) References Cited

U.S. PATENT DOCUMENTS

| | | |
|---|---|---|
| 2011/0270774 A1 | 11/2011 | Varshavsky et al. |
| 2013/0166564 A1 | 6/2013 | Su et al. |
| 2013/0218905 A1 | 8/2013 | Sankarasubramaniam et al. |
| 2014/0223575 A1 | 8/2014 | Nandi et al. |
| 2015/0019469 A1 | 1/2015 | Ioannidis et al. |
| 2015/0106366 A1 | 4/2015 | Stuttle et al. |
| 2016/0246991 A1 | 8/2016 | Bell et al. |
| 2016/0255170 A1 | 9/2016 | Gargi et al. |
| 2017/0004562 A1* | 1/2017 | Dillon .................. G06F 16/337 |
| 2017/0083962 A1 | 3/2017 | Agarwal |

FOREIGN PATENT DOCUMENTS

| | | |
|---|---|---|
| CN | 104050267 | 9/2014 |
| CN | 104380690 | 2/2015 |
| CN | 105631703 | 6/2016 |
| CN | 105959740 | 9/2016 |
| CN | 106503566 | 3/2017 |
| EP | 2747371 | 6/2014 |
| JP | 2004016922 | 1/2004 |
| JP | 2004038787 | 2/2004 |
| JP | 2014025873 | 2/2014 |
| JP | 5944251 | 7/2016 |
| JP | 2016126623 | 7/2016 |
| TW | 201327236 | 7/2013 |
| TW | 201411529 | 3/2014 |
| WO | WO2007063162 | 6/2007 |

OTHER PUBLICATIONS

Chinese Patent Office; Office Action issued in Application No. 201710906362.0 dated Jul. 24, 2020.
Intellectual Property India: Examination Report issued for Application No. 201744034241 dated Oct. 26, 2020.
Taiwan Intellectual Property Office; Decision issued in Application No. 106133497 dated Feb. 25, 2020.
Taiwan Intellectual Property Office; Office Action issued in Application No. 106133497 dated Apr. 16, 2019.
The Japanese Patent Office; Notice of Allowance issued in Application No. 2017-230273 dated Jun. 3, 2019.
Japanese Patent Office; Office Action issued in Application No. 2017-230273 dated Nov. 5, 2018.
Taiwan Intellectual Property Office; Office Action issued in Application No. 106133497 dated Oct. 3, 2018.
United Kingdom Intellectual Property Office; Combined Search and Examination Report issued in Application No. 1715905.4 dated Mar. 16, 2018.
"Enroll in the Calendar.help preview and let Cortana schedule your meetings" Office Blogs, Retrieved on Dec. 14, 2016 from https://blogs.office.com/2016/12/13enroll-in-the-calendar-help-preview-and-let-cortana-schedule-your-meetings/, 5 Pages.
Berry et al., "Netflix Recommendations for Groups", Proceedings of the American Society for Information Science and Technology, vol. 47, Issue 1, Feb. 3, 2011. 3 Pages.
O'Connor et al., "PolyLens: A Recommender System for Groups of Users", Proceedings of the Seventh European Conference on Computer Supported Cooperative Work, ECSCW, 2001, 20 Pages. Applicant points out, in accordance with MPEP 609.04(a), that the year of publication, 2001, is sufficiently earlier than the effective U.S. filing date, Dec. 30, 2016, so that the particular month of publication is not an issue.
Jameson et al., "Recommendation to Groups", The Adaptive Web Methods and Strategies of Web Personalization. Springer, 2007, pp. 596-627, 32 Pages. Applicant points out, in accordance with MPEP 609.04(a), that the year of publication, 2007, is sufficiently earlier than the effective U.S. filing date, Dec. 30, 2016, so that the particular month of publication is not an issue.

* cited by examiner

VIRTUAL ASSISTANT GENERATION OF GROUP RECOMMENDATIONS

BACKGROUND

Some computing devices may provide a user interface from which a user can chat, speak, or otherwise communicate with a virtual, computational assistant (e.g., also referred to as "an intelligent assistant" or simply as an "assistant") to cause the assistant to output useful information, respond to a user's needs, or otherwise perform certain operations to help the user complete a variety of real-world or virtual tasks. Some assistants may perform operations to simultaneously help groups of users, such as providing recommendations to groups of users based on group members' preferences.

SUMMARY

In general, techniques of this disclosure may enable virtual, computational assistants (e.g., also referred to as "intelligent assistants" or simply as "assistants"), associated with users of a group, to provide recommendations for the group, based on private information of the users, without revealing an individual user's private information to other users of the group. For instance, a computational assistant may generate an original list of recommendations based on available information for the users (e.g., publicly information for the users, or information that the users have consented to be available for recommendation generation). While the original list of recommendations may be of general interest to the group of users, one or more individual users of the group may have private preferences in favor of, or against, some of the recommendations. As such, the original list of recommendations may be of more interest to the group, if the assistant can access private information for the users that is indicative of the private preferences when generating the recommendations. However, it may be undesirable for an assistant associated with a particular user to access another private information and private preferences of another user.

In accordance with one or more techniques of this disclosure, each respective assistant may evaluate, based on respective private information for its associated user, recommendations from the original list for inclusion in a pruned list of recommendations. Each respective assistant may determine not to include (i.e., knock-out) a recommendation in the pruned list if the respective private information for its associated user indicates that the associated user has a negative preference for the recommendation. The assistants may then present (i.e., display or otherwise output) the pruned list to the users. In this way, the respective assistants may provide higher quality group recommendations that take into account the individual preferences of each of the users in the group, while still preserving the privacy of their associated user's private information.

In one example, a method includes generating, responsive to receiving a request for a recommendation for a group of users and based on first privacy level data for users of the group, an original list of recommendations for the group. In this example, the method further includes evaluating, by respective computational assistants associated with the users of the group and based on respective second privacy level data for the users of the group, recommendations from the original list of recommendations for inclusion in a pruned list of recommendations for the group, wherein the second privacy level is more restricted than the first privacy level. In this example, the method further includes, in response to the pruned list of recommendations including at least one recommendation, outputting, for presentation to the users of the group, the pruned list of recommendations.

In another example, a computing device includes at least one processor; and at least one memory comprising instructions that when executed, cause the at least one processor to provide an assistant configured to: generate, responsive to receiving a request for a recommendation for a group of users and based on first privacy level data for users of the group, an original list of recommendations for the group; output, to respective computational assistants associated with the users of the group, the original list of recommendations; receive, from respective computational assistants associated with the users of the group and based on respective second privacy level data for the users of the group, indications whether recommendations from the original list of recommendations should be included in a pruned list of recommendations for the group, wherein the second privacy level is more restricted than the first privacy level; and output, responsive to the pruned list of recommendations including at least one recommendation, the pruned list of recommendations for presentation to the users of the group.

In another example, a non-transitory computer-readable storage medium storing instructions that, when executed, cause one or more processors of a computing device to: generate, responsive to receiving a request for a recommendation for a group of users and based on first privacy level data for users of the group, an original list of recommendations for the group; output, to respective computational assistants associated with the users of the group, the original list of recommendations; receive, from respective computational assistants associated with the users of the group and based on respective second privacy level data for the users of the group, indications whether recommendations from the original list of recommendations should be included in a pruned list of recommendations for the group, wherein the second privacy level is more restricted than the first privacy level; and output, responsive to the pruned list of recommendations including at least one recommendation, the pruned list of recommendations for presentation to the users of the group.

The details of one or more examples are set forth in the accompanying drawings and the description below. Other features, objects, and advantages of the disclosure will be apparent from the description and drawings, and from the claims.

DETAILED DESCRIPTION

Figure 1:
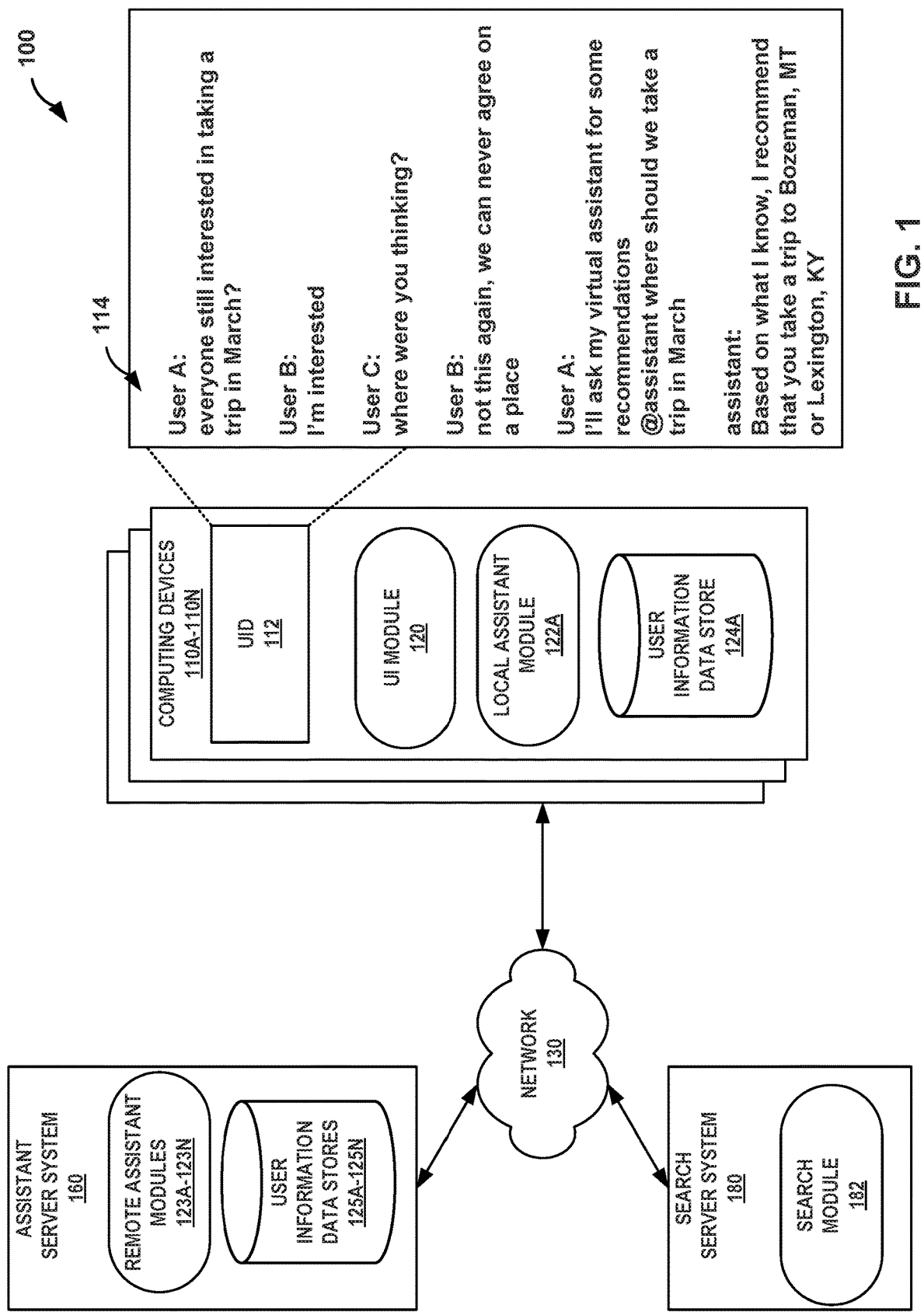
FIG. 1 is a conceptual diagram illustrating an example system that executes an example virtual assistant, in accordance with one or more aspects of the present disclosure.

FIG. 1 is a conceptual diagram illustrating an example system that executes an example virtual assistant, in accordance with one or more aspects of the present disclosure. System 100 of FIG. 1 includes assistant server system 160 in communication, via network 130, with search server system 180 and computing devices 110A-110N (collectively, "computing devices 110"). Although system 100 is shown as being distributed amongst assistant server system 160, search server system 180, and computing devices 110, in other examples, the features and techniques attributed to system 100 may be performed internally, by local components of computing devices 110. Similarly, assistant server system 160 may include certain components and perform various techniques that are otherwise attributed in the below description to search server system 180 and/or computing devices 110.

Network 130 represents any public or private communications network, for instance, cellular, Wi-Fi, and/or other types of networks, for transmitting data between computing systems, servers, and computing devices. Assistant server system 160 may exchange data, via network 130, with computing devices of computing devices 110 to provide virtual assistant services that are accessible to computing devices 110 when computing devices 110 are connected to network 130. Assistant server system 160 may exchange data, via network 130, with search server system 180 to access a search service provided by search server system 180. Computing devices 110 may exchange data, via network 130, with search server system 180 to access the search service provided by search server system 180.

Network 130 may include one or more network hubs, network switches, network routers, or any other network equipment, that are operatively inter-coupled thereby providing for the exchange of information between server systems 160 and 180 and computing devices 110. Computing devices 110, assistant server system 160, and search server system 180 may transmit and receive data across network 130 using any suitable communication techniques. Computing devices 110, assistant server system 160, and search server system 180 may each be operatively coupled to network 130 using respective network links. The links coupling computing devices 110, assistant server system 160, and search server system 180 to network 130 may be Ethernet or other types of network connections and such connections may be wireless and/or wired connections.

Assistant server system 160 and search server system 180 represent any suitable remote computing systems, such as one or more desktop computers, laptop computers, mainframes, servers, cloud computing systems, etc. capable of sending and receiving information both to and from a network, such as network 130. Assistant server system 160 hosts (or at least provides access to) a virtual assistant service. Search server system 180 hosts (or at least provides access to) a search service. In some examples, assistant server system 160 and search server system 180 represent cloud computing systems that provide access to their respective services via a cloud.

Each of computing devices 110 represents an individual mobile or non-mobile computing device. Examples of computing devices 110 include mobile phones, tablet computers, laptop computers, desktop computers, servers, mainframes, set-top boxes, televisions, wearable devices (e.g., a computerized watch, computerized eyewear, computerized gloves, etc.), home automation devices or systems (e.g., an intelligent thermostat or home assistant device), personal digital assistants (PDA), gaming systems, media players, e-book readers, mobile television platforms, automobile navigation or infotainment systems, or any other type of mobile, non-mobile, wearable, and non-wearable computing devices configured to execute or access a virtual assistant and receive information via a network, such as network 130.

Assistant server system 160 and/or search server system 180 may communicate with computing devices 110 via network 130 to give computing devices 110 access the virtual assistant services provided by assistant server system 160 and/or to provide computing devices 110 access to the search service provided by search server system 180. In the course of providing virtual assistant services, assistant server system 160 may communicate with search server system 180 via network 130 to obtain search results for providing users of the virtual assistant services information to complete a task.

System 100 may provide virtual assistant services to a plurality of users. The virtual assistant services may be provided by a combination of local and remote components. In the example of FIG. 1, assistant server system 160 includes remote assistant modules 123A-123N (collectively, "remote assistant modules 123") and user information data stores 125A-125N (collectively, "user information data stores 125"). Each of remote assistant modules 123 may maintain a respective user information data store of user information data stores 125 as part of a respective virtual assistant service that assistant server system 160 provides via network 130 for a particular user. For instance, remote assistant module 123A may maintain user information data store 125A as part of a virtual assistant service that assistant server system 160 provides via network 130 for user A, remote assistant module 123B may maintain user information data store 125B as part of a virtual assistant service that assistant server system 160 provides via network 130 for user B, . . . , and remote assistant module 123N may maintain user information data store 125N as part of a virtual assistant service that assistant server system 160 provides via network 130 for user N.

Computing device 110A includes user interface device (UID) 112, user interface (UI) module 120, local assistant module 122A, and user information data store 124A. Local assistant module 122A may maintain user information data store 124A as part of a virtual assistant service that executes locally at computing device 110A for a particular user, such as user A. Other computing devices of computing devices 110 may include components similar to computing device 110A. In some examples, each respective computing device of computing devices 110 may include a respective local assistant module and a respective user information data store that are associated with a respective user. For instance, computing device 110B may include local assistant module 122B (not shown) and user information data store 124B (not shown) associated with user B, . . . , and computing device 110N may include local assistant module 122N (not shown) and user information data store 124N (not shown) associated with user B. Local assistant modules 122A-122N may be collectively referred to as "local assistant modules 122." User information data stores 124A-124N may be collectively referred to as "user information data stores 124."

Modules 120, 122, 123, and 182 may perform operations described using software, hardware, firmware, or a mixture of hardware, software, and firmware residing in and/or executing at one of computing devices 110, assistant server system 160, or search server system 180. Computing devices 110, assistant server system 160, and search server system 180 may execute modules 120, 122, 123, and 182 with multiple processors or multiple devices. Computing devices 110, assistant server system 160, and search server system 180 may execute modules 120, 122, 123, and 182 as virtual machines executing on underlying hardware. Modules 120, 122, 123, and 182 may execute as one or more services of an operating system or computing platform. Modules 120, 122, 123, and 182 may execute as one or more executable programs at an application layer of a computing platform.

UID 112 of computing device 110A may function as an input and/or output device for computing device 110A. UID 112 may be implemented using various technologies. For instance, UID 112 may function as an input device using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology.

UID 112 may function as an input device using microphone technologies, infrared sensor technologies, or other input device technology for use in receiving user input. For example, UID 112 may detect, using built-in microphone technology, voice input that UI module 120 and/or local assistant module 122 processes for completing a task. As another example, UID 112 may include a presence-sensitive display that may receive tactile input from a user of computing device 110A. UID 112 may receive indications of tactile input by detecting one or more gestures from a user (e.g., the user touching or pointing to one or more locations of UID 112 with a finger or a stylus pen).

UID 112 may function as output (e.g., display) device and present output to a user. UID 112 may function as an output device using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110A. UID 112 may function as output device using speaker technologies, haptic feedback technologies, or other output device technology for use in outputting information to a user. UID 112 may present a user interface (e.g., user interface 114) related to a virtual assistant provided by local assistant module 122 and/or remote assistant module 123A. UID 112 may present a user interface related to other features of computing platforms, operating systems, applications, and/or services executing at and/or accessible from computing device 110 (e.g., e-mail, chat, online services, telephone, gaming, etc.).

UI module 120 may manage user interactions with UID 112 and other components of computing device 110A including interacting with assistant server system 160 so as to provide assistant services via UID 112. UI module 120 may cause UID 112 to output a user interface, such as user interface 114 (or other example user interfaces), as a user of computing device 110A views output and/or provides input at UID 112. UI module 120 and UID 112 may receive one or more indications of input (e.g., voice input, gesture input, etc.) from a user as the user interacts with the user interface, at different times and when the user and computing device 110A are at different locations. UI module 120 and UID 112 may interpret inputs detected at UID 112 and may relay information about the inputs detected at UID 112 to local assistant module 122A and/or one or more other associated platforms, operating systems, applications, and/or services executing at computing device 110A, for example, to cause computing device 110A to perform functions.

UI module 120 may receive information and instructions from one or more associated platforms, operating systems, applications, and/or services executing at computing device 110A and/or one or more remote computing systems, such as server systems 160 and 180. In addition, UI module 120 may act as an intermediary between the one or more associated platforms, operating systems, applications, and/or services executing at computing device 110A, and various output devices of computing device 110A (e.g., speakers, LED indicators, audio or haptic output device, etc.) to produce output (e.g., a graphic, a flash of light, a sound, a haptic response, etc.) with computing device 110A.

Search module 182 may execute a search for information determined to be relevant to a search query that search module 182 automatically generates (e.g., based on contextual information associated with computing device 110A) or that search module 182 receives from assistant server system 160 or computing devices 110 (e.g., as part of a task that a virtual assistant is completing on behalf of a user of a computing device of computing devices 110). Search module 182 may conduct an Internet search based on a search query to identify information (e.g., weather or traffic conditions, news, stock prices, sports scores, user schedules, transportation schedules, retail prices, etc.) related to the search query from amongst from a variety of information sources (e.g., either stored locally or remote to search server system 180). After executing a search, search module 182 may output the information returned from the search (e.g., the search results) to assistant server system 160 or a computing device of computing devices 110.

In the example of FIG. 1, user interface 114 is a graphical user interface associated with a virtual assistant service accessed by computing device 110A (e.g., provided by local assistant module 122 and/or remote assistant module 123A of assistant server system 160). User interface 114 may in some examples be an audible user interface. As shown in FIG. 1, user interface 114 shows text of a conversation between a user of computing device 110A (i.e., "User A"), a user of computing device 110B (i.e., "User B"), a user of computing device 110C (i.e., "User C"), and a virtual assistant executing at or accessible to computing devices 110. User interface 114 may include virtual assistant information in various forms such as audible sound, vibrations, text, graphics, content cards, images, etc. UI module 120 may cause UID 112 to output user interface 114 based on data UI module 120 receives via network 130 from assistant server system 160. UI module 120 may receive information (e.g., audio data, text data, image data, etc.) for presenting user interface 114 as input from assistant server system 160 and/or local assistant module 122, along with instructions from assistant server system 160 and/or local assistant module 122 for presenting the information within user interface 114 at UID 112.

Local assistant modules 122 of computing devices 110 and remote assistant modules 123 of assistant server system 160 may each perform similar functions described herein for automatically executing respective assistants for a group of users that are configured to provide recommendations to the group of users. Remote assistant modules 123 and user information data stores 125 represent server-side or cloud implementations of example virtual assistants whereas local assistant modules 122 and user information data stores 124 represent a client-side or local implementation of the example virtual assistants.

Modules 122 and 123 may each include respective software agents configured to execute as intelligent personal assistants that can perform tasks or services for an individual, such as a user of a computing device of computing devices 110. Modules 122 and 123 may perform these tasks or services based on user input (e.g., detected at UID 112), location awareness (e.g., based on context), and/or the ability to access other information (e.g., weather or traffic conditions, news, stock prices, sports scores, user schedules, transportation schedules, retail prices, etc.) from a variety of information sources (e.g., either stored locally at computing devices 110, assistant server system 160, or obtained via the search service provided by search server system 180). Modules 122 and 123 may perform artificial intelligence and/or machine learning techniques to automatically identify and complete one or more tasks on behalf of users.

The respective assistants provided by remote assistant modules 123 and local assistant modules 122 may automatically create, generate, or otherwise maintain personal records of information and store the personal records as values that are specific to the users, in a structured and semantic fashion as user information data stores 124 and user information data stores 125, respectively. Data stores 124 and 125 may enable, respectively, the respective assistants executed by remote assistant module 123 and local assistant module 122 to quickly access the personal information (e.g., the values that are specific to the user) to complete a real-world task, a virtual task, or otherwise respond to immediate or future need of the user.

Assistant modules 122 and 123 may only retain personal records associated with a user after first receiving explicit permission from the user to do-so. Thus, the user may have complete control over how their assistant collects and uses information about the user. For example, prior to retaining personal records associated with user A of computing device 110A, assistant modules 122A and 123A may cause UI module 120 to present a user interface via UID 112 that requests user A to select a box, click a button, state a voice input, or otherwise provide a specific input to the user interface that is interpreted by assistant modules 122A and 123A as unambiguous, affirmative consent for assistant modules 122A and 123A to collect and make use of user A's personal information.

Assistant modules 122 and 123 may encrypt or otherwise treat the information being maintained as personal records to remove the actual identity of the users before storing the personal information at data stores 124 and 125. For example, the information may be treated by assistant modules 122 and 123 so that any personally-identifiable information is removed from the personal records of the users when stored at data stores 124 and 125.

Assistant modules 122 and 123 may cause UI module 120 to present a user interface from which the users, may modify or remove information from the personal records stored at data stores 124 and 125. For example, the user interface may provide areas at which the users can provide input to communicate to assistant modules 122 and 123 a command to modify or remove specific pieces of personal information. In this way, each of the users of computing devices 110 may have complete control over the information being retained by respective assistant modules 122 and 123 at data stores 124 and 125.

Assistant modules 122 and 123 may enable users to control how information in data stores 124 and 125 is used. For example, assistant modules 122 and 123 may tag, mark, or otherwise annotate information in data stores 124 and 125 with various privacy levels. For instance, assistant modules 122 and 123 may mark some information in data stores 124 and 125 with a first privacy level, and mark some information in data stores 124 and 125 with a second privacy level. The second privacy level may be more restrictive than the first privacy level. That is, information marked as having the second privacy level may be considered to be more private than information marked as having the first privacy level. In some examples, information marked as having the first privacy level may be public information, or information that is otherwise publicly available.

Assistant modules 122 and 123 may, in the course of performing various operations, utilize information in data stores 124 and 125 marked with various privacy levels for varying purposes. For instance, the more private the information, the more stringent assistant modules 122 and 123 may be in protecting the information. For example, assistant modules 122 and 123 may reveal or otherwise provide information marked as public to other users and/or virtual assistants associated with other users while concealing or otherwise protecting information marked as private from other users and/or virtual assistants associated with other users. In this way, each of the users of computing devices 110 may have complete control over how the information at data stores 124 and 125 is used by respective assistant modules 122 and 123.

Each entry in the personal records stored by data stores 124 and 125 may be associated with a predefined schema that can be quickly traversed or parsed by assistant modules 122 and 123 to find the information assistant modules 122 and 123 need at a current time for understanding user needs and for helping users to complete tasks. Once personal information has been recorded as one or more values that are specific to a user, assistant modules of assistant modules 122 and 123 associated with the user can quickly use information stored at data stores 124 and 125 associated with the user to complete a task. If there is no ongoing task, assistant modules 122 and 123 may provide the users (e.g., via user interface 114) with examples of how the assistant may use the information to help the user in the future. The user may later provide input at UID 112 to command assistant modules 122 and 123 to forget or modify this information.

The values stored by data stores 124 and 125 may be textual values (e.g., names of persons, names of places, other textual descriptors of entities), numerical values (e.g., age, height, weight, other physiological data, other numerical information associated with entities), or pointers to values specific to a user associated with the data stores (e.g., a location in memory to an entity in a knowledge graph of the user, a location in memory to a contact in an address book, etc.). In other words, a value specific to a user may take many forms and be specific to a field of a personal record that is defined by the recording schema. The value may indicate the actual information that is specific to the user or may be a reference to a location from which the information specific to the user can be retrieved.

The users of computing devices 110 may be in a group. Examples of groups include, but are not limited to, groups on social media sites, chatrooms, group chats, ad-hoc designations of groups of users, or any other association of a plurality of users. The users of computing devices 110 may join the group on their own, be added to the group (after receiving consent from the user), or create the group.

Assistant modules 122 and 123 may be configured to provide one or more recommendations to a group of users, also known as group recommendations or multi-user recommendations. For instance, a user may request that assistant modules of assistant modules 122 and 123 associated with the user provide one or more recommendations for a group. Some examples of group recommendations include, but are not necessarily limited to, entertainment (e.g., recommendations of movies for the group to watch), food (e.g., recommendations of restaurants or bars for the group to go to), travel (e.g., recommendations of locations to travel to, flights to take, or tours to take), and shared merchandize (e.g., recommendations of cars/televisions/game consoles to buy).

The quality of group recommendations provided by assistant modules 122 and 123 associated with the requesting user (i.e., the user that requested the recommendation) may be related to the quality of the information available to assistant modules 122 and 123 associated with the requesting user. For instance, the more information assistant modules 122 and 123 associated with the requesting user may use about the users in the group, the higher quality the resulting recommendations (i.e., the more likely that the recommendation will be accepted by members of the group). As such, it may be desirable for assistant modules 122 and 123 associated with the requesting user to use as much personal information of individual members of a group as possible in order to generate recommendations that are likely to be accepted by more members of the group.

However, users of the group may not want their information to be accessible by other members of the group, or to assistant modules 122 and 123 associated with the requesting user. As such, assistant modules 122 and 123 associated with the requesting user may only have limited access to information for users of the group other than the requesting user. As such, assistant modules 122 and 123 associated with the requesting user may generate an original list of recommendations based on first privacy level data for users of the group. The first privacy level data may include public information for users of the group and/or information users of the group have consented to be made available for purposes of group recommendations. As the original list of recommendations is generated based at on limited data for users of the group, the original list of recommendations may not be as high quality as if assistant modules 122 and 123 associated with the requesting user had access to private information for other users of the group.

In accordance with one or more techniques of this disclosure, respective assistant modules of assistant modules 122 and 123 associated with users of the group may evaluate, based on respective second privacy level data for the users of the group, recommendations from the original list of recommendations for inclusion in a pruned list of recommendations for the group. For instance, assistant modules 122 and 123 associated with a first user of the group (e.g., assistant modules 122A and/or 123A) may evaluate recommendations from the original list of recommendations for inclusion in the pruned list of recommendations for the group based on second privacy level data for the first user, assistant modules 122 and 123 associated with a second user of the group (e.g., assistant modules 122B and/or 123B) may evaluate recommendations from the original list of recommendations for inclusion in the pruned list of recommendations for the group based on second privacy level data for the second user, etc. The second privacy level data may be more restricted than the first privacy level data. For instance, some data may default to being marked as second privacy level data, and/or users of the group may have adjusted one or more settings to cause data to be marked as second privacy level data.

Respective assistant modules of assistant modules 122 and 123 associated with users of the group may output the results of the evaluations to assistant modules 122 and 123 associated with the requesting user. For instance, respective assistant modules of assistant modules 122 and 123 associated with users of the group may output, for each respective recommendation of the original list of recommendations, an indication of whether the respective recommendation should be included in the pruned list of recommendations for the group. Assistant modules 122 and 123 associated with a particular user may determine that a particular recommendation should not be included in the pruned list of recommendations where second privacy level data for the particular user indicates that the particular user has any negative preference for the recommendation. Data for a user may indicate that the user has a negative preference for a recommendation where the data indicates that the user would not accept the recommendation, would not like the recommendation, may accept the recommendation but would prefer another option, or any other negative connotation. However, no justification or explanation may be provided with the results of the evaluations to assistant modules 122 and 123 associated with the requesting user.

Assistant modules 122 and 123 associated with the requesting user may receive the results of the evaluations and determine whether any recommendations from the original list of recommendations should be included in the pruned list of recommendations. A recommendation from the original list of recommendations should be included in the pruned list of recommendations if no respective assistant modules of assistant modules 122 and 123 associated with users of the group determine that the recommendation should not be included in the pruned list of recommendations.

In response to the pruned list of recommendations including at least one recommendation, assistant modules 122 and 123 associated with the requesting user may output, for presentation to the users of the group, the pruned list of recommendations. For instance, assistant modules 122 and 123 associated with the requesting user may output the pruned list of recommendations to assistant modules 122 and 123 associated with other users of the group, which may display, speak, or otherwise output for presentation to their associated users. As the original list of recommendations is not known to the users of the group, and the users of the group do not know which user's assistant modules caused a recommendation to not be included in the pruned list of recommendations, respective assistant modules of assistant modules 122 and 123 associated with users of the group may effectively have blind "veto power" over recommendations from the original list of recommendations. In this way, assistant modules 122 and 123 may provide higher quality recommendations while still preserving the privacy of their associated user's private information.

In some examples, such as the example described above, the requesting user may be included in the group of users for which the recommendations are generated. For instance, a user may request recommendations for the user and one or more other users. As such, in such examples, the recommendations may be generated based on data for the requesting user. In some examples, the requesting user may not be included in the group of users for which the recommendations are generated. For instance, a user may request recommendations for other users (e.g., an administrative assistant may request recommendations for a group of other users). As such, in such examples, the recommendations may not be generated based on data for the requesting user.

Among the several benefits provided by the aforementioned approach are 1) the maintaining the privacy of an individual user's personal information while making use of the user's personal information to generate higher quality recommendations for a group that includes the user, 2) generating higher quality recommendations to minimize the amount of time, and therefore power (e.g., battery power), needed to arrive at a group consensus.

Figure 2:
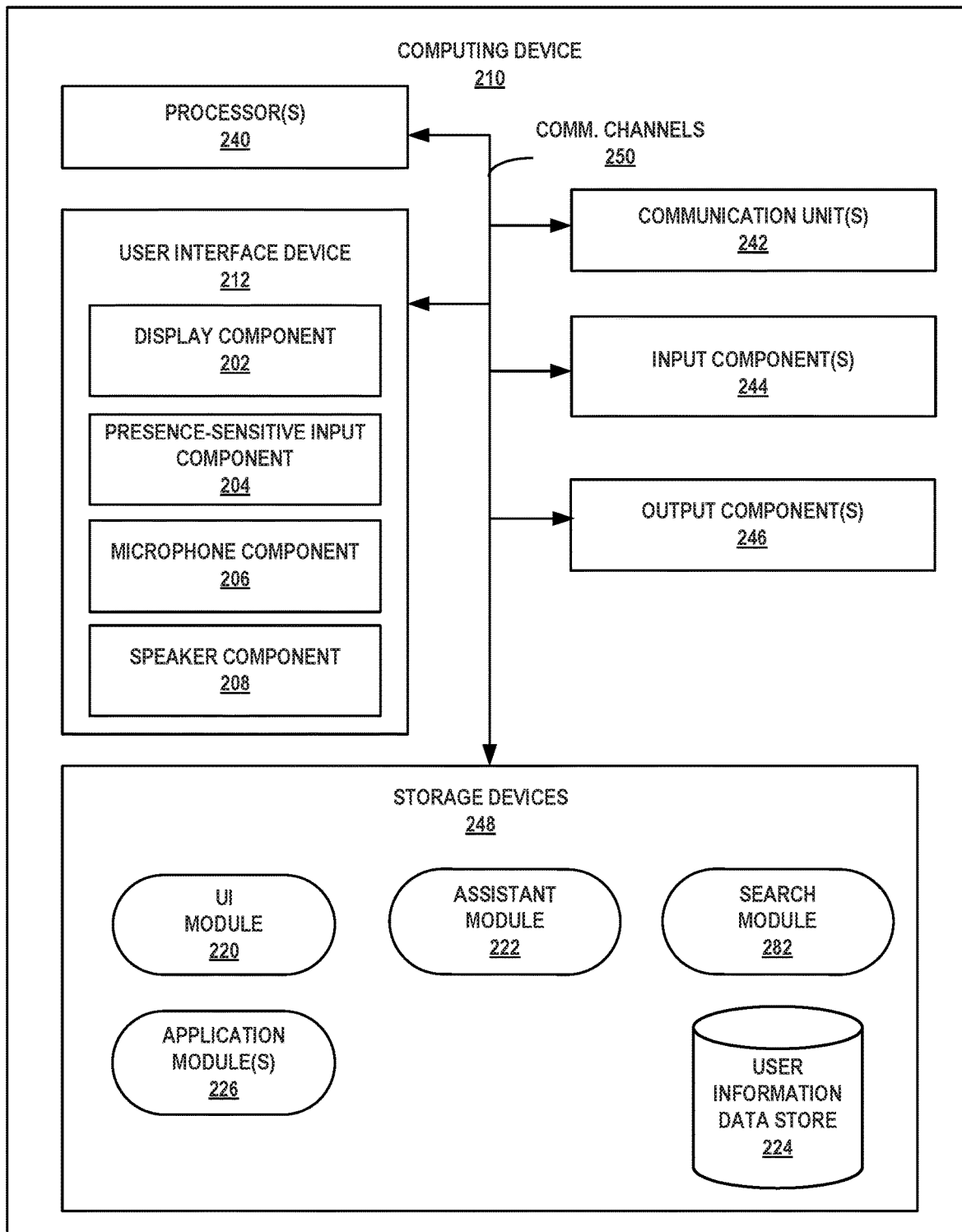
FIG. 2 is a block diagram illustrating an example computing device that is configured to execute an example virtual assistant, in accordance with one or more aspects of the present disclosure.

FIG. 2 is a block diagram illustrating an example computing device that is configured to execute an example virtual assistant, in accordance with one or more aspects of the present disclosure. Computing device 210 of FIG. 2 is described below as an example of a computing device of computing devices 110 of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes user interface device (USD) 212, one or more processors 240, one or more communication units 242, one or more input components 244, one or more output components 246, and one or more storage components 248. USD 212 includes display component 202, presence-sensitive input component 204, microphone component 206, and speaker component 208. Storage components 248 of computing device 210 include UI module 220, assistant module 222, search module 282, one or more application modules 226, and user information data store 224.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices (e.g., assistant server system 160 and/or search server system 180 of system 100 of FIG. 1) via one or more wired and/or wireless networks by transmitting and/or receiving network signals on one or more networks (e.g., network 130 of system 100 of FIG. 1). Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 242 of computing device 210, in one example, includes a presence-sensitive input device (e.g., a touch sensitive screen, a PSD), mouse, keyboard, voice responsive system, camera, microphone or any other type of device for detecting input from a human or machine. In some examples, input components 242 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, step counter sensor.

One or more output components 246 of computing device 110 may generate output. Examples of output are tactile, audio, and video output. Output components 246 of computing device 210, in one example, includes a presence-sensitive display, sound card, video graphics adapter card, speaker, cathode ray tube (CRT) monitor, liquid crystal display (LCD), or any other type of device for generating output to a human or machine.

UID 212 of computing device 210 may be similar to UID 112 of computing device 110 and includes display component 202, presence-sensitive input component 204, microphone component 206, and speaker component 208. Display component 202 may be a screen at which information is displayed by USD 212 while presence-sensitive input component 204 may detect an object at and/or near display component 202. Speaker component 208 may be a speaker from which audible information is played by UID 212 while microphone component 206 may detect audible input provided at and/or near display component 202 and/or speaker component 208.

While illustrated as an internal component of computing device 210, UID 212 may also represent an external component that shares a data path with computing device 210 for transmitting and/or receiving input and output. For instance, in one example, UID 212 represents a built-in component of computing device 210 located within and physically connected to the external packaging of computing device 210 (e.g., a screen on a mobile phone). In another example, UID 212 represents an external component of computing device 210 located outside and physically separated from the packaging or housing of computing device 210 (e.g., a monitor, a projector, etc. that shares a wired and/or wireless data path with computing device 210).

As one example range, presence-sensitive input component 204 may detect an object, such as a finger or stylus that is within two inches or less of display component 202. Presence-sensitive input component 204 may determine a location (e.g., an [x, y] coordinate) of display component 202 at which the object was detected. In another example range, presence-sensitive input component 204 may detect an object six inches or less from display component 202 and other ranges are also possible. Presence-sensitive input component 204 may determine the location of display component 202 selected by a user's finger using capacitive, inductive, and/or optical recognition techniques. In some examples, presence-sensitive input component 204 also provides output to a user using tactile, audio, or video stimuli as described with respect to display component 202. In the example of FIG. 2, PSD 212 may present a user interface (such as graphical user interface 114 of FIG. 1).

Speaker component 208 may comprise a speaker built-in to a housing of computing device 210 and in some examples, may be a speaker built-in to a set of wired or wireless headphones that are operably coupled to computing device 210. Microphone component 206 may detect audible input occurring at or near UID 212. Microphone component 206 may perform various noise cancellation techniques to remove background noise and isolate user speech from a detected audio signal.

UID 212 of computing device 210 may detect two-dimensional and/or three-dimensional gestures as input from a user of computing device 210. For instance, a sensor of UID 212 may detect a user's movement (e.g., moving a hand, an arm, a pen, a stylus, etc.) within a threshold distance of the sensor of UID 212. UID 212 may determine a two or three-dimensional vector representation of the movement and correlate the vector representation to a gesture input (e.g., a hand-wave, a pinch, a clap, a pen stroke, etc.) that has multiple dimensions. In other words, UID 212 can detect a multi-dimension gesture without requiring the user to gesture at or near a screen or surface at which UID 212 outputs information for display. Instead, UID 212 can detect a multi-dimensional gesture performed at or near a sensor which may or may not be located near the screen or surface at which UID 212 outputs information for display.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Modules 220, 222, 226, and 282 may be operable by processors 240 to perform various actions, operations, or functions of computing device 210. For example, processors 240 of computing device 210 may retrieve and execute instructions stored by storage components 248 that cause processors 240 to perform the operations modules 220, 222, 226, and 282. The instructions, when executed by processors 240, may cause computing device 210 to store information within storage components 248.

One or more storage components 248 within computing device 210 may store information for processing during operation of computing device 210 (e.g., computing device 210 may store data accessed by modules 220, 222, 226, and 282 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220, 222, 226, and 282 and data store 224. Storage components 248 may include a memory configured to store data or other information associated with modules 220, 222, 226, and 282 and data store 224.

UI module 220 may include all functionality of UI module 120 of computing device 110 of FIG. 1 and may perform similar operations as UI module 120 for managing a user interface (e.g., user interface 114) that computing device 210 provides at USD 212 for example, for facilitating interactions between a user of computing device 110 and assistant module 222. For example, UI module 220 of computing device 210 may receive information from assistant module 222 that includes instructions for outputting (e.g., displaying or playing audio) an assistant user interface (e.g., user interface 114). UI module 220 may receive the information from assistant module 222 over communication channels 250 and use the data to generate a user interface. UI module 220 may transmit a display or audible output command and associated data over communication channels 250 to cause UID 212 to present the user interface at UID 212.

In some examples, UI module 220 may receive an indication of one or more user inputs detected at UID 212 and may output information about the user inputs to assistant module 222. For example, UID 212 may detect a voice input from a user and send data about the voice input to UI module 220.

UI module 220 may send an indication of the voice input to assistant module 222 for further interpretation. Assistant module 222 may determine, based on the voice input, that the detected voice input represents a user request for assistant module 222 to perform one or more tasks.

Application modules 226 represent all the various individual applications and services executing at and accessible from computing device 210 that may be accessed by an assistant, such as assistant module 222, to provide user with information and/or perform a task. A user of computing device 210 may interact with a user interface associated with one or more application modules 226 to cause computing device 210 to perform a function. Numerous examples of application modules 226 may exist and include, a fitness application, a calendar application, a search application, a map or navigation application, a transportation service application (e.g., a bus or train tracking application), a social media application, a game application, an e-mail application, a chat or messaging application, an Internet browser application, or any and all other applications that may execute at computing device 210.

Search module 282 of computing device 210 may perform integrated search functions on behalf of computing device 210. Search module 282 may be invoked by UI module 220, one or more of application modules 226, and/or assistant module 222 to perform search operations on their behalf. When invoked, search module 282 may perform search functions, such as generating search queries and executing searches based on generated search queries across various local and remote information sources. Search module 282 may provide results of executed searches to the invoking component or module. That is, search module 282 may output search results to UI module 220, assistant module 222, and/or application modules 226 in response to an invoking command.

Assistant module 222 may include all functionality of a local assistant module of local assistant modules 122 of a computing device of computing devices 110 of FIG. 1 and may perform similar operations as the local assistant module for providing an assistant. In some examples, assistant module 222 may execute locally (e.g., at processors 240) to provide assistant functions. In some examples, assistant module 222 may act as an interface to a remote assistant service accessible to computing device 210. For example, assistant module 222 may be an interface or application programming interface (API) to a remote assistant module of remote assistant modules 124 of assistant server system 160 of FIG. 1.

Similar to user information data stores 124 and 125 of system 100 of FIG. 1, user information data store 224 may store personal records created by assistant module 222 that includes information that assistant module 222 has learned or been provided about the user of computing device 210. Assistant module 222 may rely on the information stored at data store 224, in addition to any information provided by search module 282, to perform assistant tasks.

Similar to assistant modules 122 and 123 of FIG. 1, assistant module 222 may be configured to generate recommendations for a group of users. For instance, assistant module 222 may generate an original list of recommendations based on first privacy level data for users of the group, and output the original list of recommendations for evaluation by computational assistants associated with other users of the group. Assistant module 222 may receive, from the computational assistants associated with the other users of the group, indications of whether recommendations from the original list of recommendations should be included in a pruned list of recommendations for the group. In some examples, the indications may be positive. For instance, a computational assistant associated with another user of the group may output, to assistant module 222, a list of recommendations from the original list of recommendations that are approved for inclusion in the pruned list of recommendations. In some examples, the indications may be negative. For instance, a computational assistant associated with another user of the group may output, to assistant module 222, a list of recommendations from the original list of recommendations that are not approved for inclusion in the pruned list of recommendations (i.e., a list of recommendations from the original list of recommendations that the computational assistant associated with another user vetoes).

The computational assistants associated with the users of the group may generate the indications based on respective second privacy level data for the users of the group. As discussed above, use of data marked with the second privacy level may be more restricted than data marked with the first privacy level. As also discussed above, users of the group may be provided with options for controlling which data is marked as the second privacy level, and the computational assistants associated with the other users of the group may receive consent to use data marked with the second privacy level for generating group recommendations.

A computational assistant associated with a particular user of the group may determine that a particular recommendation should not be included in the pruned list of recommendations where second privacy level data for the particular user indicates that the particular user has any negative preference for the recommendation. Data for a user may indicate that the user has a negative preference for a recommendation where the data indicates that the user would not accept the recommendation, would not like the recommendation, may accept the recommendation but would prefer another option, or any other negative connotation.

Assistant module 222 may generate the pruned list of recommendations based on the evaluations performed by the computational assistants. For instance, assistant module 222 may determine whether each respective recommendation included in the original list of recommendations was vetoed by at least one of the computational assistants. If a recommendation from the original list of recommendations was not vetoed by any of the computation assistants, assistant module 222 may include the recommendation in the pruned list of recommendations.

Responsive to the pruned list of recommendations including at least one recommendation (i.e., where at least one recommendation from the original list of recommendations was not vetoed by any of the computational assistants associated with the users of the group), assistant module 222 may output the pruned list of recommendations for presentation to the users of the group. As one example, assistant module 222 may cause UI module 220 to display, via display component 202, a GUI that includes the pruned list of recommendations. As another example, assistant module 222 may cause UI module 220 to output, via speaker component 208, synthesized speech that includes the pruned list of recommendations. As another example, assistant module 222 may output the pruned list of recommendations to the computational assistants associated with the other users of the group, which may then display, speak, or otherwise output the pruned list of recommendations to their respective users.

In some examples, the pruned list of recommendations may not include any recommendations. For instance, every recommendation from the original list of recommendations may be vetoed by at least one computational assistant of the computational assistants associated with the users of the group. In some examples, assistant module 222 may inform the user of computing device 210 that assistant module 222 was unable to generate any recommendations for the group. However, it may not be desirable for assistant module 222 to not be able to generate any recommendations for the group, in particular where recommendations were pruned based on users having any negative preference for the recommendations.

In accordance with one or more techniques of this disclosure, assistant module 222 may cause the computational assistants associated with users of the group to evaluate the recommendations from the original list of recommendations for inclusion in a revised pruned list of recommendations based on weighted second privacy level data for the users of the group. As one example, a computational assistant associated with a particular user of the group may determine that a recommendation from the original list of recommendations should not be included in the revised pruned list of recommendations in response to determining that second privacy level data for the particular user of the group indicates that the particular user has a complete negative preference for the recommendation. As another example, a computational assistant associated with a particular user of the group may determine that a recommendation from the original list of recommendations should be included in the revised pruned list of recommendations in response to determining that second privacy level data for the particular user of the group indicates that the particular user has a partial negative preference for the recommendation.

Data for a user may indicate that the user has a complete negative preference for a recommendation where the data indicates that the user would not accept the recommendation, would not like the recommendation, would never accept the recommendation, or any other total negative preference. For instance, data that indicated that a user is a vegetarian may indicate that the user has a complete negative preference if the user would be ok offended to go to a steak house. Data for a user may indicate that the user has a partial negative preference for a recommendation where the data indicates that the user may accept the recommendation but would prefer another option, would normally not like the recommendation, but would accept the recommendation for the sake of the group, or any other abating connotation. For instance, data that indicated that a user is a vegetarian may indicate that the user has a partial negative preference if the user would be ok with ordering a salad.

Assistant module 222 may generate the revised pruned list of recommendations based on the evaluations performed by the computational assistants. For instance, assistant module 222 may determine whether each respective recommendation included in the original list of recommendations was vetoed by at least one of the computational assistants based on the weighted data. If a recommendation from the original list of recommendations was not vetoed by any of the computation assistants based on the weighted data, assistant module 222 may include the recommendation in the revised pruned list of recommendations.

Responsive to the revised pruned list of recommendations including at least one recommendation, assistant module 222 may output the revised pruned list of recommendations for presentation to the users of the group. As one example, assistant module 222 may cause UI module 220 to display, via display component 202, a GUI that includes the revised pruned list of recommendations. As another example, assistant module 222 may cause UI module 220 to output, via speaker component 208, synthesized speech that includes the revised pruned list of recommendations. As another example, assistant module 222 may output the revised pruned list of recommendations to the computational assistants associated with the other users of the group, which may then display, speak, or otherwise output the revised pruned list of recommendations to their respective users.

In some example, the computational assistants associated with the users of the group, including assistant module 222, may refrain from outputting any indication of the data used to generate the list of recommendations (either pruned or revised pruned). For instance, the computational assistants may refrain from indicating whether the list of recommendations is based on second privacy level data (i.e., is the pruned list) or weighted second privacy level data (i.e., is the revised pruned list). The computational assistants may refrain from outputting any indication of the original list of recommendations. As such, the computational assistants may enable generation of group recommendations based on group members' private data without revealing the private data. In this way, the computational assistant may generate higher quality recommendations for groups.

Figure 3:
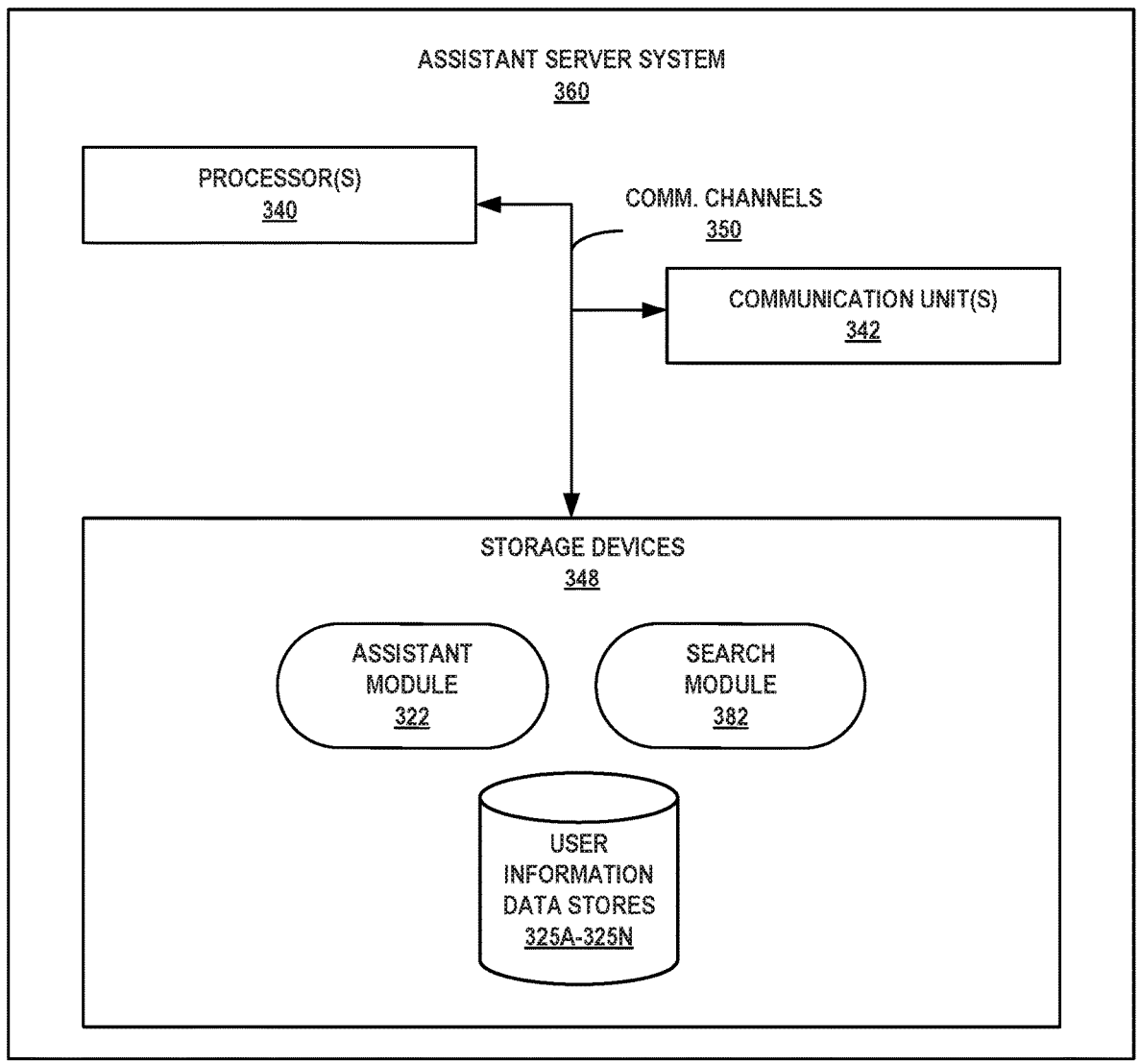
FIG. 3 is a block diagram illustrating an example computing system that is configured to execute an example virtual assistant, in accordance with one or more aspects of the present disclosure.

FIG. 3 is a block diagram illustrating an example computing system that is configured to execute an example virtual assistant, in accordance with one or more aspects of the present disclosure. Assistant server system 360 of FIG. 3 is described below as an example of assistant server system 160 of FIG. 1. FIG. 3 illustrates only one particular example of assistant server system 360, and many other examples of assistant server system 360 may be used in other instances and may include a subset of the components included in example assistant server system 360 or may include additional components not shown in FIG. 3.

As shown in the example of FIG. 3, assistant server system 360 includes user one or more processors 340, one or more communication units 342, and one or more storage devices 348. Storage devices 348 include assistant module 322, search module 382, and user information data stores 325A-325N (collectively, "user information data stores 325").

Processors 340 are analogous to processors 240 of computing system 210 of FIG. 2. Communication units 342 are analogous to communication units 242 of computing system 210 of FIG. 2. Storage devices 348 are analogous to storage devices 248 of computing system 210 of FIG. 2. Communication channels 350 are analogous to communication channels 250 of computing system 210 of FIG. 2 and may therefore interconnect each of the components 340, 342, and 348 for inter-component communications. In some examples, communication channels 350 may include a system bus, a network connection, an inter-process communication data structure, or any other method for communicating data.

Search module 382 of assistant server system 360 is analogous to search module 282 of computing device 210 and may perform integrated search functions on behalf of assistant server system 360. That is, search module 482 may perform search operations on behalf of assistant module 322. In some examples, search module 382 may interface with external search systems to perform search operations on behalf of assistant module 322. When invoked, search module 382 may perform search functions, such as generating search queries and executing searches based on generated search queries across various local and remote information sources. Search module 382 may provide results of executed searches to the invoking component or module. That is, search module 382 may output search results to assistant module 322.

Assistant module 322 may include all functionality of a local assistant module or local assistant modules 122 and a remote assistant module of remote assistant modules 123 of FIG. 1, as well as assistant module 222 of computing device 210 of FIG. 2. Assistant module 322 may perform similar operations as a remote assistant module of remote assistant modules 122 for providing an assistant service that is accessible via assistant server system 360. That is, assistant module 322 may act as an interface to a remote assistant service accessible to a computing device that is communicating over a network with assistant server system 360. For example, assistant module 322 may be an interface or API to a remote assistant module of remote assistant modules 122 of assistant server system 160 of FIG. 1.

Similar to user information data stores 124 and 125 of system 100 of FIG. 1, user information data store 325 may respectively store personal records created by assistant module 322 that includes information that assistant module 322 has learned or been provided about respective users. Assistant module 322 may rely on the information stored at data store 325, in addition to any information provided by search module 382, to perform assistant tasks.

Figure 4:
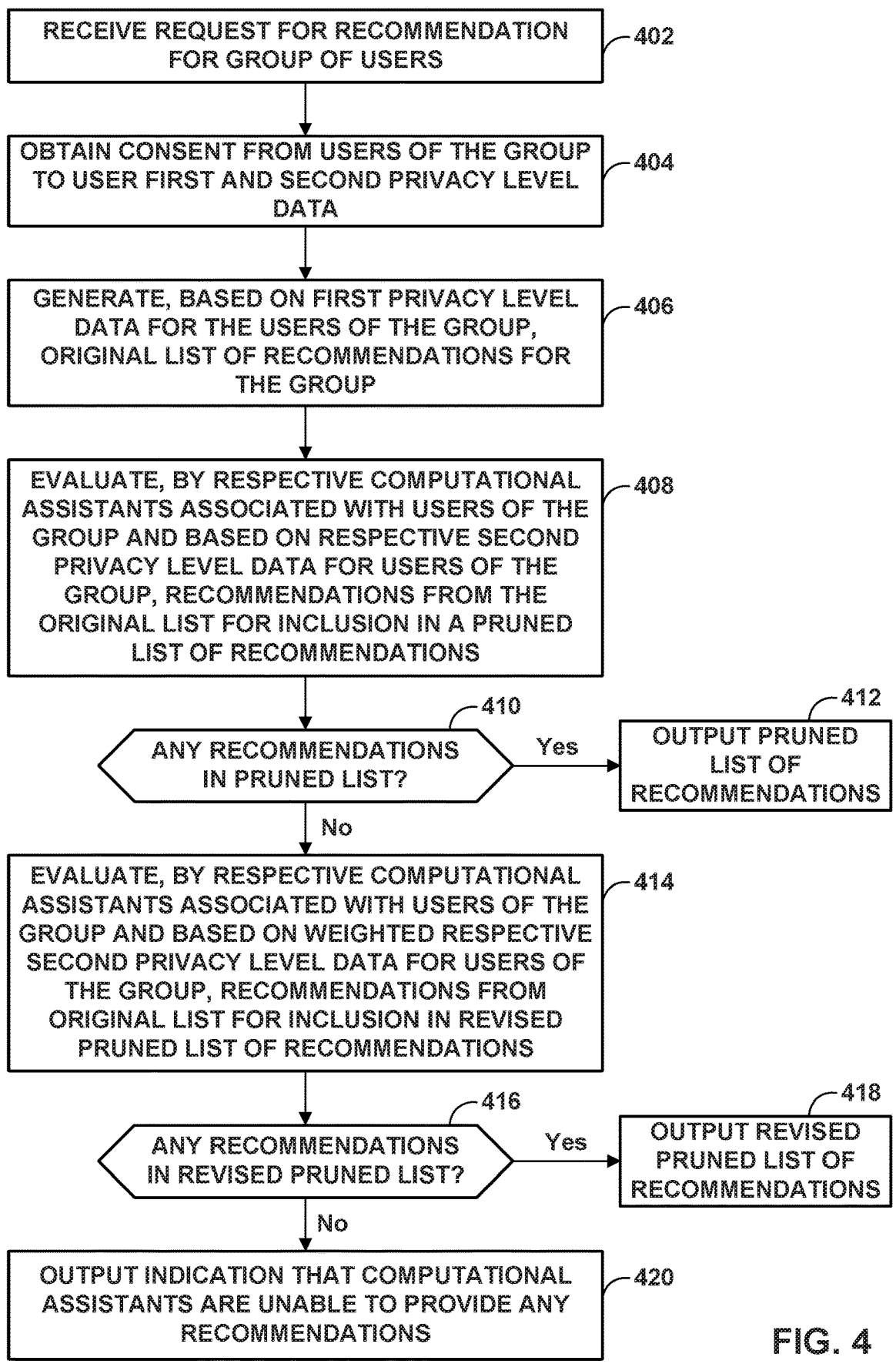
FIG. 4 is a flowchart illustrating example operations performed by one or more processors executing an example virtual assistant, in accordance with one or more aspects of the present disclosure.

FIG. 4 is a flowchart illustrating example operations performed by one or more processors executing an example virtual assistant, in accordance with one or more aspects of the present disclosure. FIG. 4 is described below in the context of system 100 of FIG. 1. For example, local assistant module 122A while executing at one or more processors of computing device 110A may perform one or more of operations 402-420, in accordance with one or more aspects of the present disclosure. And in some examples, remote assistant module 122A while executing at one or more processors of assistant server system 160 may perform one or more of operations 402-420, in accordance with one or more aspects of the present disclosure. For purposes of illustration only, FIG. 4 is described below within the context of computing devices 110A of FIG. 1.

In operation, computing device 110A may receive a request to generate a recommendation for a group of users (402). As shown in the example of FIG. 1, User A, User B, and User C may be in a group chat. User A may ask is "everyone still interested in taking a trip in March?" User B may respond by saying "I'm interested," and User C may ask "where were you thinking?" However, seeing where the chat is going, User B may say "not this again, we can never agree on a place." To avoid having to discuss potential destinations, User A may state that they will "ask their virtual assistant for some recommendations." In the example of FIG. 1, User A may ask their virtual assistant for some recommendations by entering an assistant activation command and provide a request for a recommendation for the group of users. For instance, UI module 120 may receive an indication of user input at UID 112 of User A typing "@ assistant where should we take a trip in March." UI module 120 may provide the user input to assistant modules 122A and/or 123A.

Assistant modules associated with users of the group may obtain consent from users of the group to use first and second privacy level data (404). For instance, assistant modules 122A and/or 123A may obtain consent from User A to use first and second privacy level data of User A, assistant modules 122B and/or 123B may obtain consent from User B to use first and second privacy level data of User B, and assistant modules 122C and/or 123C may obtain consent from User C to use first and second privacy level data of User C.

Assistant modules 122A and/or 123A may generate, based on first privacy level data for the users of the group, an original list of recommendations for the group (406). For instance, assistant modules 122A and/or 123A may evaluate first privacy level data for User A, User B, and User C to generate an original list of recommendations. In this example, first privacy level data for the group may indicate that User A, User B, and User C all enjoy winter mountain sports (e.g., skiing or snowboarding), bourbon, and tropical vacations. Based on said first privacy level data, assistant modules 122A and/or 123A may generate the original list of recommendations to include Bozeman, Mont. for winter mountain sports, Lexington, Ky. for bourbon tasting and distillery tours, and a Caribbean island for a beach vacation. Assistant modules 122A and/or 123A may disseminate or otherwise output the original list of recommendations to computational assistants associated with other users of the group. For instance, assistant modules 122A and/or 123A may output the original list of recommendations to computational assistants associated with User B (e.g., assistant modules 122B and/or 123B), and computational assistants associated with User C (e.g., assistant modules 122C and/or 123C.)

The respective computational assistants associated with users of the group may evaluate, based on respective second privacy level data for the users of the group, recommendations from the original list of recommendations for inclusion in a pruned list of recommendations (408). For instance, assistant modules 122A and/or 123A may determine, based on second privacy level data for User A, whether User A has any negative preference for recommendations from the original list of recommendations. Similarly, computational assistants associated with User B may determine, based on second privacy level data for User B, whether User B has any negative preference for recommendations from the original list of recommendations, and computational assistants associated with User C may determine, based on second privacy level data for User C, whether User C has any negative preference for recommendations from the original list of recommendations.

To continue with the above example, assistant modules 122A and/or 123A may determine that User A has a partial negative preference for winter mountain sports in Bozeman, Mont. based at least on second privacy level data for User A indicating that User A recently went on a ski trip. As such, assistant modules 122A and/or 123A may determine that bourbon tasting and distillery tours in Lexington, Ky. and a beach vacation at the Caribbean island should be included in the pruned list, and that winter mountain sports in Bozeman, Mont. should not be included in the pruned list.

Computational assistants associated with User B may determine that User B has a complete negative preference for the Caribbean island based at least on second privacy level data for User B indicating that User B is trying to conceive a child and has performed a lot of searches on the Zika virus and data indicating that the Zika virus is present on the Caribbean island. As such, computational assistants associated with User B may determine that winter mountain sports in Bozeman, Mont. and bourbon tasting and distillery tours in Lexington, Ky. should be included in the pruned list, and that the beach vacation at the Caribbean island should not be included in the pruned list.

Computational assistants associated with User C may determine that User C has a partial negative preference for bourbon tasting and distillery tours in Lexington, Ky. based at least on second privacy level data for User C indicating that User C is has been trying to drink less alcohol. As such, computational assistants associated with User C may determine that winter mountain sports in Bozeman, Mont. and the beach vacation at the Caribbean island should be included in the pruned list, and that bourbon tasting and distillery tours in Lexington, Ky. should not be included in the pruned list.

Assistant modules 122A and/or 123A may generate the pruned list of recommendations based on the evaluations performed by the computational assistants. For instance, assistant modules 122A and/or 123A may determine whether each respective recommendation included in the original list of recommendations was vetoed by at least one of the computational assistants. If a recommendation from the original list of recommendations was not vetoed by any of the computation assistants, assistant modules 122A and/or 123A may include the recommendation in the pruned list of recommendations.

Assistant modules 122A and/or 123A may determine whether there are any recommendations in the resulting pruned list of recommendations (410). Responsive to the pruned list of recommendations including at least one recommendation (i.e., where at least one recommendation from the original list of recommendations was not vetoed by any of the computational assistants associated with the users of the group) ("Yes" branch of 410), assistant modules 122A and/or 123A may output the pruned list of recommendations (412). As one example, assistant modules 122A and/or 123A may cause UI module 120 to display a GUI that includes the pruned list of recommendations. As another example, assistant module 122A and/or 123A may cause UI module 120 to output synthesized speech that includes the pruned list of recommendations. As another example, assistant module 122A and/or 123A may output the pruned list of recommendations to the computational assistants associated with the other users of the group, which may then display, speak, or otherwise output the pruned list of recommendations to their respective users.

Responsive to the pruned list of recommendations not including at least one recommendation ("No" branch of 410), the respective computational assistants associated with users of the group may evaluate, based on weighted respective second privacy level data for the users of the group, recommendations from the original list of recommendations for inclusion in a revised pruned list of recommendations (414). In some examples, the evaluations may be performed concurrently. For instance, the respective computational assistants associated with users of the group may concurrently evaluate recommendations from the original list of recommendations for inclusion in the pruned list of recommendations based on respective second privacy level data for the users of the group, and evaluate recommendations from the original list of recommendations for inclusion in the revised pruned list of recommendations based on weighted respective second privacy level data for the users of the group. If the revised pruned list includes at least one recommendation ("Yes" branch of 416), assistant modules 122A and/or 123A may output the revised pruned list of recommendations (418). For instance, assistant modules 122A and/or 123A may output the revised pruned list of recommendations in a manner similar to the output of the pruned list of recommendations described above. If the revised pruned list does include at least one recommendation ("No" branch of 416), assistant modules 122A and/or 123A may output an indication that the computation assistants were unable to provide any recommendations for the group (420).

To continue with the above example where the original list of recommendations included Bozeman, Mont. for winter mountain sports, Lexington, Ky. for bourbon tasting and distillery tours, and a Caribbean island for a beach vacation. Assistant modules 122A and/or 123A may determine, based on the evaluations, that there are no recommendations remaining in the pruned list. In particular, winter mountain sports in Bozeman, Mont. was vetoed by User A's computational assistant (i.e., assistant modules 122A and/or 123A), bourbon tasting and distillery tours in Lexington, Ky. was vetoed by User C's computational assistant (i.e., assistant modules 122C and/or 123C), and the beach vacation at the Caribbean island was vetoed by User B's computational assistant (i.e., assistant modules 122B and/or 123B).

Computational assistants associated with User A, User B, and User C may evaluate, based on weighted respective second privacy level data for the respective users, recommendations from the original list of recommendations for inclusion in a revised pruned list of recommendations. For instance, because second privacy level data for User A indicates that User A only has a partial negative preference for winter mountain sports in Bozeman, Mont. and no negative preference for bourbon tasting and distillery tours in Lexington, Ky. and a beach vacation at the Caribbean island, assistant modules 122A and/or 123A may determine that winter mountain sports in Bozeman, Mont., bourbon tasting and distillery tours in Lexington, Ky., and the beach vacation at the Caribbean island should be included in the revised pruned list. Similarly, because second privacy level data for User C indicates that User C only has a partial negative preference for bourbon tasting and distillery tours in Lexington, Ky. and no negative preference for winter mountain sports in Bozeman, Mont. and a beach vacation at the Caribbean island, computational assistants associated with User C may determine that winter mountain sports in Bozeman, Mont., bourbon tasting and distillery tours in Lexington, Ky., and the beach vacation at the Caribbean island should be included in the revised pruned list. However, because second privacy level data for User B indicates that User B has a complete negative preference for the beach vacation at the Caribbean island and no negative preference for winter mountain sports in Bozeman, Mont. and bourbon tasting and distillery tours in Lexington, Ky., computational assistants associated with User B may determine that winter mountain sports in Bozeman, Mont. and bourbon tasting and distillery tours in Lexington, Ky. should be included in the revised pruned list, and that the beach vacation at the Caribbean island should not be included in the revised pruned list.

Assistant modules 122A and/or 123A may determine, based on the evaluations, that winter mountain sports in Bozeman, Mont. and bourbon tasting and distillery tours in Lexington, Ky. should be included in the revised pruned list. As the revised pruned list includes at least one recommendation, assistant modules 122A and/or 123A may output the revised pruned list for presentation to users of the group.

Figure 5:
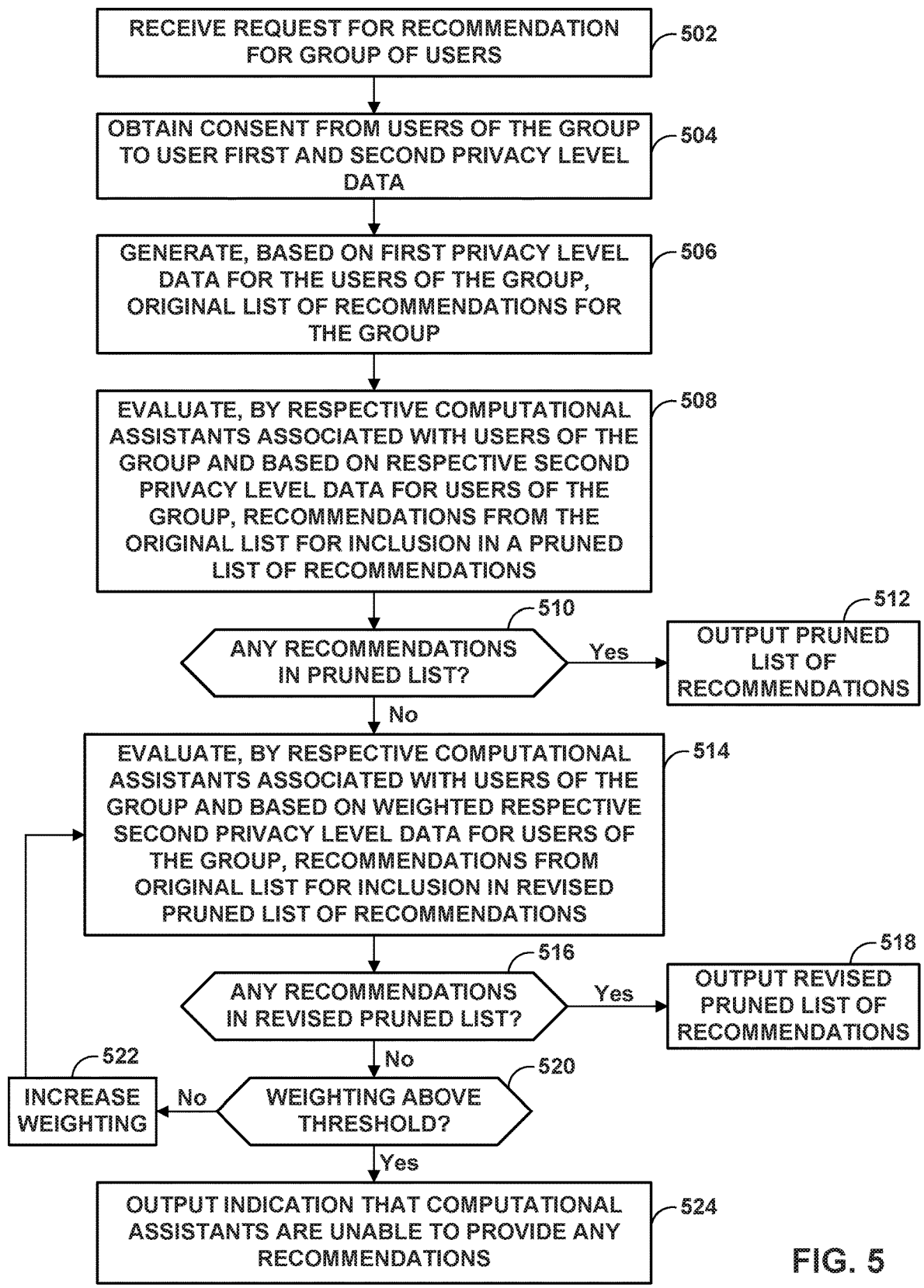
FIG. 5 is a flowchart illustrating example operations performed by one or more processors executing an example virtual assistant, in accordance with one or more aspects of the present disclosure.

FIG. 5 is a flowchart illustrating example operations performed by one or more processors executing an example virtual assistant, in accordance with one or more aspects of the present disclosure. FIG. 5 is described below in the context of system 100 of FIG. 1. For example, local assistant module 122A while executing at one or more processors of computing device 110A may perform one or more of operations 502-524, in accordance with one or more aspects of the present disclosure. And in some examples, remote assistant module 122A while executing at one or more processors of assistant server system 160 may perform one or more of operations 502-520, in accordance with one or more aspects of the present disclosure. For purposes of illustration only, FIG. 5 is described below within the context of computing devices 110A of FIG. 1.

In operation, computing device 110A may receive a request to generate a recommendation for a group of users (502). As shown in the example of FIG. 1, User A, User B, and User C may be in a group chat. User A may ask is "everyone still interested in taking a trip in March?" User B may respond by saying "I'm interested," and User C may ask "where were you thinking?" However, seeing where the chat is going, User B may say "not this again, we can never agree on a place." To avoid having to discuss potential destinations, User A may state that they will "ask their virtual assistant for some recommendations." In the example of FIG. 1, User A may ask their virtual assistant for some recommendations by entering an assistant activation command and provide a request for a recommendation for the group of users. For instance, UI module 120 may receive an indication of user input at UID 112 of User A typing "@ assistant where should we take a trip in March." UI module 120 may provide the user input to assistant modules 122A and/or 123A.

Assistant modules associated with users of the group may obtain consent from users of the group to use first and second privacy level data (504). For instance, assistant modules 122A and/or 123A may obtain consent from User A to use first and second privacy level data of User A, assistant modules 122B and/or 123B may obtain consent from User B to use first and second privacy level data of User B, and assistant modules 122C and/or 123C may obtain consent from User C to use first and second privacy level data of User C.

Assistant modules 122A and/or 123A may generate, based on first privacy level data for the users of the group, an original list of recommendations for the group (506). For instance, assistant modules 122A and/or 123A may evaluate first privacy level data for User A, User B, and User C to generate an original list of recommendations. In this example, first privacy level data for the group may indicate that User A, User B, and User C all enjoy winter mountain sports (e.g., skiing or snowboarding), bourbon, and tropical vacations. Based on said first privacy level data, assistant modules 122A and/or 123A may generate the original list of recommendations to include Bozeman, Mont. for winter mountain sports, Lexington, Ky. for bourbon tasting and distillery tours, and a Caribbean island for a beach vacation. Assistant modules 122A and/or 123A may disseminate or otherwise output the original list of recommendations to computational assistants associated with other users of the group. For instance, assistant modules 122A and/or 123A may output the original list of recommendations to computational assistants associated with User B (e.g., assistant modules 122B and/or 123B), and computational assistants associated with User C (e.g., assistant modules 122C and/or 123C.)

The respective computational assistants associated with users of the group may evaluate, based on respective second privacy level data for the users of the group, recommendations from the original list of recommendations for inclusion in a pruned list of recommendations (508). For instance, assistant modules 122A and/or 123A may determine, based on second privacy level data for User A, whether User A has any negative preference for recommendations from the original list of recommendations. Similarly, computational assistants associated with User B may determine, based on second privacy level data for User B, whether User B has any negative preference for recommendations from the original list of recommendations, and computational assistants associated with User C may determine, based on second privacy level data for User C, whether User C has any negative preference for recommendations from the original list of recommendations.

To continue with the above example, assistant modules 122A and/or 123A may determine that User A has a partial negative preference for (e.g., a 60% preference against) winter mountain sports in Bozeman, Mont. based at least on second privacy level data for User A indicating that User A recently went on a ski trip. As such, assistant modules 122A and/or 123A may determine that bourbon tasting and distillery tours in Lexington, Ky. and a beach vacation at the Caribbean island should be included in the pruned list, and that winter mountain sports in Bozeman, Mont. should not be included in the pruned list.

Computational assistants associated with User B may determine that User B has a complete negative preference for (e.g., a 100% preference against) the Caribbean island based at least on second privacy level data for User B indicating that User B is trying to conceive a child and has performed a lot of searches on the Zika virus and data indicating that the Zika virus is present on the Caribbean island. As such, computational assistants associated with User B may determine that winter mountain sports in Bozeman, Mont. and bourbon tasting and distillery tours in Lexington, Ky. should be included in the pruned list, and that the beach vacation at the Caribbean island should not be included in the pruned list.

Computational assistants associated with User C may determine that User C has a partial negative preference for (e.g., a 25% preference against) bourbon tasting and distillery tours in Lexington, Ky. based at least on second privacy level data for User C indicating that User C is has been trying to drink less alcohol. As such, computational assistants associated with User C may determine that winter mountain sports in Bozeman, Mont. and the beach vacation at the Caribbean island should be included in the pruned list, and that bourbon tasting and distillery tours in Lexington, Ky. should not be included in the pruned list.

Assistant modules 122A and/or 123A may generate the pruned list of recommendations based on the evaluations performed by the computational assistants. For instance, assistant modules 122A and/or 123A may determine whether each respective recommendation included in the original list of recommendations was vetoed by at least one of the computational assistants. If a recommendation from the original list of recommendations was not vetoed by any of the computation assistants, assistant modules 122A and/or 123A may include the recommendation in the pruned list of recommendations.

Assistant modules 122A and/or 123A may determine whether there are any recommendations in the resulting pruned list of recommendations (510). Responsive to the pruned list of recommendations including at least one recommendation (i.e., where at least one recommendation from the original list of recommendations was not vetoed by any of the computational assistants associated with the users of the group) ("Yes" branch of 510), assistant modules 122A and/or 123A may output the pruned list of recommendations (512). As one example, assistant modules 122A and/or 123A may cause UI module 120 to display a GUI that includes the pruned list of recommendations. As another example, assistant module 122A and/or 123A may cause UI module 120 to output synthesized speech that includes the pruned list of recommendations. As another example, assistant module 122A and/or 123A may output the pruned list of recommendations to the computational assistants associated with the other users of the group, which may then display, speak, or otherwise output the pruned list of recommendations to their respective users.

Responsive to the pruned list of recommendations not including at least one recommendation ("No" branch of 510), the respective computational assistants associated with users of the group may evaluate, based on weighted respective second privacy level data for the users of the group, recommendations from the original list of recommendations for inclusion in a revised pruned list of recommendations (514). For instance, a computational assistant associated with a user of the group may determine whether second privacy level data for the user indicates that the users have a negative preference for the recommendations that is above an initial threshold. In some examples, the threshold may be initially set low (e.g., 5%, 10%, 15%, . . . , 25%, etc.) and, as discussed in further detail below, may be increased if no recommendations are able to be provided. An assistant may determine that a recommendation should not be included in the revised pruned list of recommendations where the assistant determines that second privacy level data for the user indicates that the user's preference for the recommendation is above the threshold. In some examples, if the assistants are not able to provide any recommendations using the initial threshold, the assistants may determine whether second privacy level data for the users indicates that the users have a negative preference for the recommendations that is above an increased threshold (e.g., 5%, 10%, etc., higher than the previous threshold).

If the revised pruned list includes at least one recommendation ("Yes" branch of 516), assistant modules 122A and/or 123A may output the revised pruned list of recommendations (518). For instance, assistant modules 122A and/or 123A may output the revised pruned list of recommendations in a manner similar to the output of the pruned list of recommendations described above. If the revised pruned list does include at least one recommendation ("No" branch of 516), assistant modules 122A and/or 123A may determine whether the weighting used to evaluate the recommendations is above a max threshold (520). For instance, assistant modules 122A and/or 123A may determine whether the threshold used to evaluate the recommendations is above a maximum overall threshold level (e.g., 75%, 85%, 90%, 95%). If the weighting is above the max threshold ("Yes" branch of 520), assistant modules 122A and/or 123A may output an indication that the computation assistants were unable to provide any recommendations for the group (524). If the weighting is not above the max threshold ("No" branch of 520), assistant modules 122A and/or 123A may increase the weighting (522). For instance, assistant modules 122A and/or 123A may increase the threshold by 5%, 10%, 20%, etc. The respective computational assistants associated with users of the group may evaluate, based on the increased weighting of the respective second privacy level data for the users of the group, recommendations from the original list of recommendations for inclusion in the revised pruned list of recommendations (514). For instance, a computational assistant associated with a user of the group may determine whether second privacy level data for the user indicates that the users have a negative preference for the recommendations that is above the increased threshold. In some examples, the loop may continue until the computational assistants are able to provide at least one recommendation. In some examples, the loop may continue until the threshold used to evaluate the recommendations is above a maximum overall threshold level. In this way, assistant modules may include the most desirable recommendations in the revised pruned list while not including recommendations that some users have strong negative preferences against.

To continue with the above example where the original list of recommendations included Bozeman, Mont. for winter mountain sports, Lexington, Ky. for bourbon tasting and distillery tours, and a Caribbean island for a beach vacation. Assistant modules 122A and/or 123A may determine, based on the evaluations, that there are no recommendations remaining in the pruned list. In particular, winter mountain sports in Bozeman, Mont. was vetoed by User A's computational assistant (i.e., assistant modules 122A and/or 123A), bourbon tasting and distillery tours in Lexington, Ky. was vetoed by User C's computational assistant (i.e., assistant modules 122C and/or 123C), and the beach vacation at the Caribbean island was vetoed by User B's computational assistant (i.e., assistant modules 122B and/or 123B).

Computational assistants associated with User A, User B, and User C may evaluate, based on weighted respective second privacy level data for the respective users, recommendations from the original list of recommendations for inclusion in a revised pruned list of recommendations. For instance, computational assistants associated with User A, User B, and User C may determine whether second privacy data for the respective users indicates that the respective users have a preference against recommendations from the original list of recommendations that satisfies an initial threshold (10% for purposes of this example).

For instance, because second privacy level data for User A indicates that User A has 60% preference against winter mountain sports in Bozeman, Mont. and no negative preference for bourbon tasting and distillery tours in Lexington, Ky. and a beach vacation at the Caribbean island, assistant modules 122A and/or 123A may determine that winter mountain sports in Bozeman, Mont. (e.g., because the 60% preference against is greater than the threshold of 10%) should not be included in the revised pruned list, and that bourbon tasting and distillery tours in Lexington, Ky. and the beach vacation at the Caribbean island should be included in the revised pruned list. Similarly, because second privacy level data for User C indicates that User C has a 25% preference against bourbon tasting and distillery tours in Lexington, Ky. and no negative preference for winter mountain sports in Bozeman, Mont. and a beach vacation at the Caribbean island, computational assistants associated with User C may determine that bourbon tasting and distillery tours in Lexington, Ky. (e.g., because the 25% preference against is greater than the threshold of 10%) should not be included in the revised pruned list, and that winter mountain sports in Bozeman, Mont., and the beach vacation at the Caribbean island should be included in the revised pruned list. Additionally, because second privacy level data for User B indicates that User B has a 100% preference against the beach vacation at the Caribbean island and no negative preference for winter mountain sports in Bozeman, Mont. and bourbon tasting and distillery tours in Lexington, Ky., computational assistants associated with User B may determine that winter mountain sports in Bozeman, Mont. and bourbon tasting and distillery tours in Lexington, Ky. should be included in the revised pruned list, and that the beach vacation at the Caribbean island should not be included in the revised pruned list.

Assistant modules 122A and/or 123A may determine, based on the evaluations, that no recommendations from the original list of recommendations should be included in the revised pruned list (e.g., as winter mountain sports in Bozeman, Mont. was vetoed by User A's computation assistant, the beach vacation at the Caribbean island was vetoed by User B's computational assistant, and bourbon tasting and distillery tours in Lexington, Ky. was vetoed by User C's computational assistant). As the revised pruned list does not include any recommendations, assistant modules 122A and/or 123A may increase the threshold. For instance, assistant modules 122A and/or 123A may increase the threshold to 30%. As User C's preference against bourbon tasting and distillery tours in Lexington, Ky. of 25% is less than the increased threshold of 30%, the computation assistant associated with User C may determine that bourbon tasting and distillery tours in Lexington, Ky. should be included in the revised pruned list of recommendations. However, as User A's preference against winter mountain sports in Bozeman, Mont. of 60% is above the increased threshold of 30%, the computation assistant associated with User A may determine that winter mountain sports in Bozeman, Mont. should still not be included in the revised pruned list of recommendations. Similarly, as User B's preference against the beach vacation at the Caribbean island of 100% is above the increased threshold of 30%, the computation assistant associated with User B may determine that the beach vacation at the Caribbean island should still not be included in the revised pruned list of recommendations. As the revised pruned list includes at least one recommendation, assistant modules 122A and/or 123A may output the revised pruned list for presentation to users of the group.

The following numbered examples may illustrate one or more aspects of the disclosure:

Example 1

A method comprising: in response to receiving a request for a recommendation for a group of users, generating, based on first privacy level data for users of the group, an original list of recommendations for the group; evaluating, by respective computational assistants associated with the users of the group and based on respective second privacy level data for the users of the group, recommendations from the original list of recommendations for inclusion in a pruned list of recommendations for the group, wherein the second privacy level is more restricted than the first privacy level; and in response to the pruned list of recommendations including at least one recommendation, outputting, for presentation to the users of the group, the pruned list of recommendations.

Example 2

The method of example 1, wherein the pruned list of recommendations comprises a first pruned list of recommendations, the method further comprising: in response to the first pruned list of recommendations including zero recommendations, evaluating, by respective computational assistants of the users of the group and based on weighted respective second privacy level data for the users of the group, recommendations from the original list of recommendations for inclusion in a second pruned list of recommendations for the group; and in response to the second pruned list of recommendations including at least one recommendation, outputting, for presentation to the users of the group, the second pruned list of recommendations.

Example 3

The method of example 2, wherein evaluating, by a computational assistant associated with a particular user of the group and based on respective second privacy level data for the particular user of the group, a recommendation from the original list of recommendations for inclusion in the first pruned list of recommendations for the group comprises: determining not to include the recommendation in the first pruned list of recommendations in response to determining that respective second privacy level data for the particular user of the group indicates that the particular user has any negative preference for the recommendation.

Example 4

The method of example 3, wherein evaluating, by the computational assistant associated with the particular user of the group and based on weighted respective second privacy level data for the particular user of the group, the recommendation from the original list of recommendations for inclusion in the second pruned list of recommendations for the group comprises: determining not to include the recommendation in the second pruned list of recommendations in response to determining that respective second privacy level data for the particular user of the group indicates that the particular user has a complete negative preference for the recommendation.

Example 5

The method of any combination of examples 1-4, wherein evaluating, by the computational assistant associated with the particular user of the group and based on weighted respective second privacy level data for the particular user of the group, the recommendation from the original list of recommendations for inclusion in the second pruned list of recommendations for the group comprises: determining to include the recommendation in the second pruned list of recommendations in response to determining that respective second privacy level data for the particular user of the group indicates that the particular user has a partial negative preference for the recommendation.

Example 6

The method of any combination of examples 1-5, wherein the request is received from a requesting user that is not included in the group of users, and wherein the original list of recommendations is not generated based on data for the requesting user.

Example 7

The method of any combination of examples 1-5, wherein the request is received from a requesting user that is included in the group of users, and wherein the original list of recommendations is generated based on data for the requesting user.

Example 8

The method of any combination of examples 1-7, wherein the request is for one or more of: entertainment recommendations; food recommendations; travel recommendations; and shared merchandize recommendations.

Example 9

The method of any combination of examples 1-8, wherein the first privacy level data for the users of the group comprises publicly available data for the users of the group.

Example 10

A computing device comprising: at least one processor; and at least one memory comprising instructions that when executed, cause the at least one processor to provide a computational assistant configured to: generate, responsive to receiving a request for a recommendation for a group of users and based on first privacy level data for users of the group, an original list of recommendations for the group; output, to respective computational assistants associated with the users of the group, the original list of recommendations; receive, from respective computational assistants associated with the users of the group and based on respective second privacy level data for the users of the group, indications whether recommendations from the original list of recommendations should be included in a pruned list of recommendations for the group, wherein the second privacy level is more restricted than the first privacy level; and output, responsive to the pruned list of recommendations including at least one recommendation, the pruned list of recommendations for presentation to the users of the group.

Example 11

The computing device of example 10, wherein the pruned list of recommendations comprises a first pruned list of recommendations, the computational assistant further configured to: receive, from respective computational assistants associated with the users of the group and based on weighted respective second privacy level data for the users of the group, indications whether recommendations from the original list of recommendations should be included in a second pruned list of recommendations for the group; and output, responsive to the second pruned list of recommendations including at least one recommendation and for presentation to the users of the group, the second pruned list of recommendations.

Example 12

The computing device of example 11, wherein a computational assistant associated with a particular user is configured to: determine not to include a recommendation from the original list of recommendations in the first pruned list of recommendations in response to determining that respective second privacy level data for the particular user of the group indicates that the particular user has any negative preference for the recommendation.

Example 13

The computing device of example 12, wherein the computational assistant associated with the particular user is configured to: determine not to include the recommendation in the second pruned list of recommendations in response to determining that respective second privacy level data for the particular user of the group indicates that the particular user has a complete negative preference for the recommendation.

Example 14

The computing device of any combination of examples 10-13, wherein the computational assistant associated with the particular user is configured to: determine to include the recommendation in the second pruned list of recommendations in response to determining that respective second privacy level data for the particular user of the group indicates that the particular user has a partial negative preference for the recommendation.

Example 15

The computing device of any combination of examples 10-14, wherein the request is received from a requesting user that is not included in the group of users, and wherein the original list of recommendations is not generated based on data for the requesting user.

Example 16

The computing device of any combination of examples 10-14, wherein the request is received from a requesting user that is included in the group of users, and wherein the original list of recommendations is generated based on data for the requesting user.

Example 17

The computing device of any combination of examples 10-16, wherein the request is for one or more of: entertainment recommendations; food recommendations; travel recommendations; and shared merchandize recommendations.

Example 18

The computing device of any combination of examples 10-17, wherein the first privacy level data for the users of the group comprises publicly available data for the users of the group.

Example 19

A non-transitory computer-readable storage medium storing instructions that, when executed, cause one or more processors of a computing device to: generate, responsive to receiving a request for a recommendation for a group of users and based on first privacy level data for users of the group, an original list of recommendations for the group; output, to respective computational assistants associated with the users of the group, the original list of recommendations; receive, from respective computational assistants associated with the users of the group and based on respective second privacy level data for the users of the group, indications whether recommendations should be included in a pruned list of recommendations for the group, wherein the second privacy level is more restricted than the first privacy level; and output, responsive to the pruned list of recommendations including at least one recommendation, the pruned list of recommendations for presentation to the users of the group.

Example 20

The non-transitory computer-readable storage medium of example 19, wherein the pruned list of recommendations comprises a first pruned list of recommendations, the non-transitory computer-readable storage medium further storing instructions that cause the one or more processors of the computing device to: receive, from respective computational assistants associated with the users of the group and based on weighted respective second privacy level data for the users of the group, indications whether recommendations from the original list of recommendations should be included in a second pruned list of recommendations for the group; and output, responsive to the second pruned list of recommendations including at least one recommendation and for presentation to the users of the group, the second pruned list of recommendations.

Example 21

The non-transitory computer-readable storage medium of example 19, further storing instructions that cause the one or more processors to perform the method of any combination of examples 1-9.

Example 22

A computing device comprising means for performing the method of any combination of examples 1-9.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method implemented by one or more processors comprising:
   receiving, from a respective computing device of a requesting user, a request for a recommendation for a group of users, wherein the requesting user is not included in the group of users;
   generating, responsive to receiving the request for the recommendation from the requesting user, and based on respective first privacy level data for each of the users of the group, an original list of recommendations for the group, wherein the respective first privacy level data includes publicly available data for each of the users of the group;
   transmitting, to respective computational assistants associated with a corresponding one of the users of the group, the original list of recommendations;
   receiving, from each of the respective computational assistants, and based on respective second privacy level data for each of the users of the group, an indication of whether a given recommendation from the original list of recommendations should be included in a pruned list of recommendations, wherein the respective second privacy level data includes data-restricted private data for each of the users of the group;
   in response to determining the received indication that is received from each of the respective computational assistants indicates that the given recommendation should be included in the pruned list of recommendations:
      determining to include the given recommendation in the pruned list of recommendations; and
   providing, for presentation to the requesting user via the respective computing device, the pruned list of recommendations.

2. The method of claim 1, further comprising:
   determining whether the pruned list of recommendations includes at least one recommendation; and
   wherein providing the pruned list of recommendations for presentation to the requesting user is in response to determining that the pruned list of recommendations includes at least one recommendation.

3. The method of claim 2, further comprising:
   in response to determining that the pruned list of recommendations does not include any recommendations:
      transmitting, to the respective computational assistants, the original list of recommendations along with a corresponding indication that the pruned list of recommendations does not include any recommendations; and
      receiving, from each of the respective computational assistants, and based on weighted respective second privacy level data for each of the users of the group, a further indication of whether the given recommendation from the original list of recommendations should be included in a revised pruned list of recommendations.

4. The method of claim 3, further comprising:
   determining whether the revised pruned list of recommendations includes at least one recommendation; and
   wherein providing the pruned list of recommendations for presentation to the requesting user comprises providing the revised pruned list of recommendations for presentation to the user is in response to determining that the revised pruned list of recommendations includes at least one recommendation.

5. The method of claim 1, further comprising:
   determining whether the received indication from a given one the respective computational assistants indicates the given recommendation should not be included in the pruned list of recommendations; and
   in response to determining that the received indication that is received from the given one of the respective computational assistants indicates that the given recommendation should not be included in the pruned list of recommendations:
      determining not to include the given recommendation in the pruned list of recommendations.

6. The method of claim 1, wherein providing the pruned list of recommendations for presentation to the requesting user comprises one or more of:
   causing the respective computing device of the requesting user to visually render the pruned list of recommendations via a display of the respective computing device or an additional respective computing device of the requesting user; or
   causing the respective computing device of the requesting user to audibly render the pruned list of recommendations via one or more speakers of the respective computing device or the additional respective computing device of the requesting user.

7. The method of claim 1, wherein the original list of recommendations is not generated based on first level privacy data for the requesting user.

8. The method of claim 1, wherein the request for the recommendation for the group of users is for one or more of:
an entertainment recommendation;
a restaurant recommendation;
a travel recommendation; or
a shared merchandise recommendation.

9. A system comprising:
at least one processor; and
at least one memory comprising instructions that, when executed, cause the at least one processor to:
receive, from a respective computing device of a requesting user, a request for a recommendation for a group of users, wherein the requesting user is not included in the group of users;
generate, responsive to receiving the request for the recommendation from the requesting user, and based on respective first privacy level data for each of the users of the group, an original list of recommendations for the group, wherein the respective first privacy level data includes publicly available data for each of the users of the group;
transmit, to respective computational assistants associated with a corresponding one of the users of the group, the original list of recommendations;
receive, from each of the respective computational assistants, and based on respective second privacy level data for each of the users of the group, an indication of whether a given recommendation from the original list of recommendations should be included in a pruned list of recommendations, wherein the respective second privacy level data includes data-restricted private data for each of the users of the group;
in response to determining the received indication that is received from each of the respective computational assistants indicates that the given recommendation should be included in the pruned list of recommendations:
determine to include the given recommendation in the pruned list of recommendations; and
cause the respective computing device of the requesting user to render the pruned list of recommendations.

10. The system of claim 9, wherein the instructions further cause the at least one processor to:
determine whether the revised pruned list of recommendations includes at least one recommendation; and
wherein the instructions to cause the respective computing device of the requesting user to render the list of recommendations comprise instructions to cause the respective computing device of the requesting user to render the list of recommendations in response to determining that the revised pruned list of recommendations includes at least one recommendation.

11. The system of claim 9, wherein the instructions further cause the at least one processor to:
determine whether the received indication from a given one the respective computational assistants indicates the given recommendation should not be included in the pruned list of recommendations; and
in response to determining that the received indication that is received from the given one of the respective computational assistants indicates that the given recommendation should not be included in the pruned list of recommendations:
determine not to include the given recommendation in the pruned list of recommendations.

12. The system of claim 9, wherein the instructions to cause the respective computing device of the requesting user to render the pruned list of recommendations comprise instructions that cause the at least one processor to:
cause the respective computing device of the requesting user to visually render the pruned list of recommendations via a display of the respective computing device or an additional respective computing device of the requesting user; or
cause the respective computing device of the requesting user to audibly render the pruned list of recommendations via one or more speakers of the respective computing device or the additional respective computing device of the requesting user.

13. The system of claim 9, wherein the original list of recommendations is not generated based on first level privacy data for the requesting user.

14. The system of claim 9, wherein the request for the recommendation for the group of users is for one or more of:
an entertainment recommendation;
a restaurant recommendation;
a travel recommendation; or
a shared merchandise recommendation.

15. A non-transitory computer-readable storage medium storing instructions that, when executed, cause at least one processor to:
receive, from a respective computing device of a requesting user, a request for a recommendation for a group of users, wherein the requesting user is not included in the group of users;
generate, responsive to receiving the request for the recommendation from the requesting user, and based on respective first privacy level data for each of the users of the group, an original list of recommendations for the group, wherein the respective first privacy level data includes publicly available data for each of the users of the group;
transmit, to respective computational assistants associated with a corresponding one of the users of the group, the original list of recommendations;
receive, from each of the respective computational assistants, and based on respective second privacy level data for each of the users of the group, an indication of whether a given recommendation from the original list of recommendations should be included in a pruned list of recommendations, wherein the respective second privacy level data includes data-restricted private data for each of the users of the group;
in response to determining the received indication that is received from each of the respective computational assistants indicates that the given recommendation should be included in the pruned list of recommendations:
determine to include the given recommendation in the pruned list of recommendations; and
provide, for presentation to the requesting user via the respective computing device, the pruned list of recommendations.

16. The system of claim 10, wherein the instructions further cause the at least one processor to:
in response to determining the pruned list of recommendations does not include any recommendations:
transmit, to the respective computational assistants, the original list of recommendations along with a corresponding indication that the pruned list of recommendations does not include any recommendations; and receive, from each of the respective computational assistants, and based on weighted respective second privacy level data for each of the users of the group, a further indication of whether the given recommendation from the original list of recommendations should be included in a revised pruned list of recommendations.

17. The system of claim 16, wherein the instructions further cause the at least one processor to:
determine whether the revised pruned list of recommendations includes at least one recommendation; and
wherein the instructions to cause the respective computing device of the requesting user to render the pruned list of recommendations comprise instructions to cause the respective computing device of the requesting user to render the revised pruned list of recommendations in response to determining the revised pruned list of recommendations includes at least one recommendation.

* * * * *